United States Patent
Lu et al.

(10) Patent No.: US 7,421,762 B2
(45) Date of Patent: Sep. 9, 2008

(54) HINGE FOR A LIQUID CRYSTAL DISPLAY

(75) Inventors: Sheng-Nan Lu, Shulin (TW); Jason Chen, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 467 days.

(21) Appl. No.: 11/333,334

(22) Filed: Jan. 18, 2006

(65) Prior Publication Data
US 2007/0163081 A1    Jul. 19, 2007

(51) Int. Cl.
*E05D 11/10* (2006.01)
*E04G 3/00* (2006.01)

(52) U.S. Cl. ............... 16/328; 16/330; 248/292.13; 248/918

(58) Field of Classification Search ............... 16/328, 16/337, 327, 333, 335, 338, 340; 248/291.1, 248/292.11, 292.13, 917
See application file for complete search history.

(56) References Cited

U.S. PATENT DOCUMENTS

| | | | |
|---|---|---|---|
| 6,666,422 B1 * | 12/2003 | Lu et al. ............. | 248/291.1 |
| 6,671,928 B2 * | 1/2004 | Huang ............. | 16/340 |
| 6,899,311 B1 * | 5/2005 | Ternus ............. | 248/454 |
| 6,929,224 B1 * | 8/2005 | Masuda et al. ............. | 248/176.3 |
| 2004/0055114 A1 * | 3/2004 | Lu ............. | 16/340 |
| 2005/0108854 A1 * | 5/2005 | Lee et al. ............. | 16/340 |
| 2007/0245524 A1 * | 10/2007 | Hsu ............. | 16/366 |
| 2007/0262224 A1 * | 11/2007 | Cheng ............. | 248/423 |

* cited by examiner

*Primary Examiner*—Victor Batson
*Assistant Examiner*—Emily M Morgan
(74) *Attorney, Agent, or Firm*—Hershkovitz & Associates, LLC; Abe Hershkovitz

(57) ABSTRACT

A hinge of a LCD has a stationary bracket, a first shaft assembly and a second shaft assembly. The LCD had a base and a screen. The stationary bracket is attached to the base. Each shaft assembly is mounted pivotally on the stationary bracket and has an adapting bracket to be attached to the screen. The first shaft assembly has a stationary limiting element, a switching element and a rotating limiting element. The stationary limiting element has a limiting recess with two ends and a narrower stop formed in the limiting recess. The rotating limiting element is pushed by the switching element and has two stops. Pushing the switching element to change the stops of the rotating limiting element respectively corresponding to the narrower stop or the ends of the limiting recess to adjust the limitation of the rotating angle of the screen.

6 Claims, 9 Drawing Sheets

HINGE FOR A LIQUID CRYSTAL DISPLAY

BACKGROUND OF THE INVENTION

1. Field of the Invention

The present invention relates to a hinge, especially to a hinge for a liquid crystal display.

2. Description of the Prior Arts

A liquid crystal display (LCD) comprises a screen, a base and a hinge. The hinge is mounted pivotally between the screen and the base to allow the screen to pivot relative to the base. The screen has a bottom edge and a rear surface. The base may be attached pivotally to the rear surface of the screen by the hinge and has a bottom edge. The bottom edges of the screen and the base stand on a desktop. Pivoting the screen relative to the base adjusts the viewing angle of the screen. To assemble or reassemble the hinge conveniently, the hinge allows the screen to be perpendicular to the base. However the screen may pivot accidentally to be perpendicular to the base when the LCD is used, which is not a good viewing angle.

To overcome the shortcomings, the present invention provides a hinge for a LCD to mitigate or obviate the aforementioned problems.

SUMMARY OF THE INVENTION

The main objective of the present invention is to provide a hinge that has different limitation to the rotating angle of a screen of a liquid crystal display (LCD). The hinge for a LCD has a stationary bracket, a first shaft assembly and a second shaft assembly. The LCD had a base and a screen. The stationary bracket is attached to the base. Each shaft assembly is mounted pivotally on the stationary bracket and has an adapting bracket to be attached to the screen. The first shaft assembly has a stationary limiting element, a switching element and a rotating limiting element. The stationary limiting element has a limiting recess with two ends and a narrower stop formed in the limiting recess. The rotating limiting element is pushed by the switching element and has two stops. Pivoting the screen rotates the rotating limiting element to slide the stops in the limiting recess. Pushing the switching element to change the stops of the rotating limiting element respectively corresponding to the narrower stop or the ends of the limiting recess to adjust the limitation of the rotating angle of the screen.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
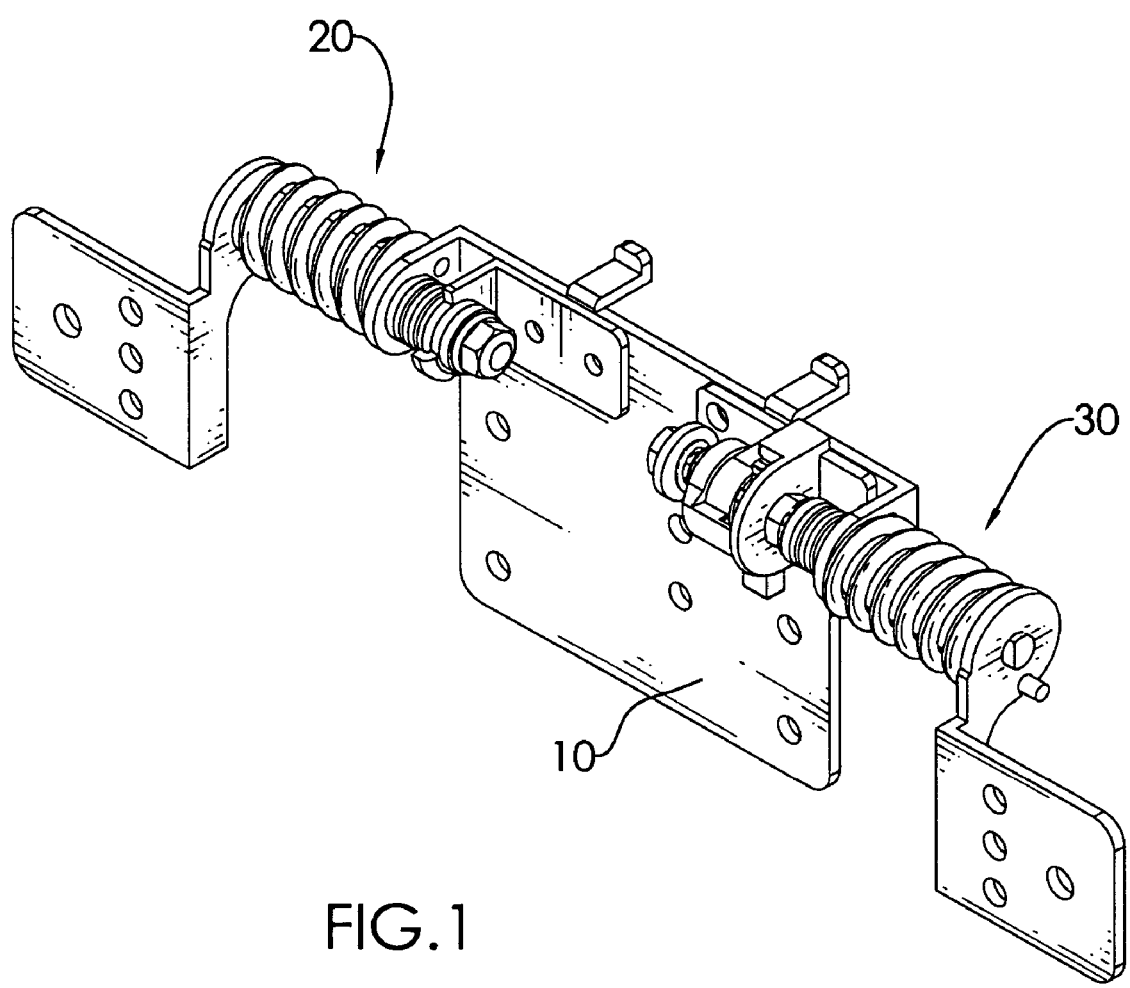
FIG. 1 is a perspective view of a hinge for a liquid crystal display (LCD) in accordance with the present invention.

With reference to FIG. 1, a hinge for a liquid crystal display (LCD) in accordance with the present invention comprises a stationary bracket (10), a first shaft assembly (30) and a second shaft assembly (20).

Figure 2:
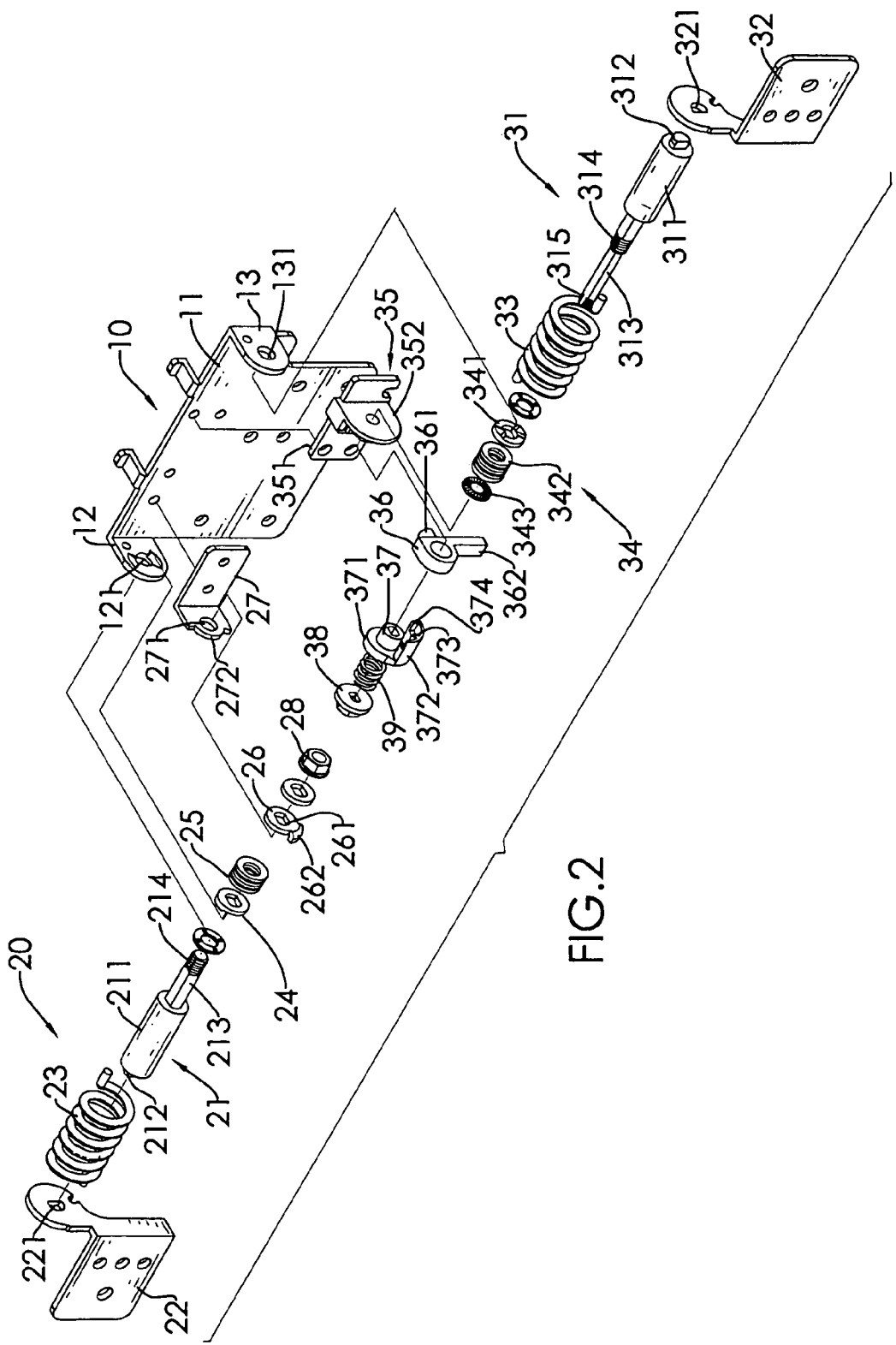
FIG. 2 is an exploded perspective view of the hinge in FIG. 1.

With further reference to FIG. 2, the stationary bracket (10) has a central board (11), a first wing (13) and a second wing (12). The central board (11) has two sides. The first and second wings (13, 12) are formed respectively on the two sides of the central board (11) and are perpendicular to the central board (11). Each wing (13, 12) has an outside surface, an inside surface, a central circular hole (131, 121) and at least one positioning detent. The inside surfaces of the two wings (13, 12) face to each other. The central circular hole (131, 121) is formed through the wing (13, 12). The at least one positioning detent is formed in the inside surface of the wing (13, 12).

The first shaft assembly (30) is mounted pivotally to the first wing (13) of the stationary bracket (10) and has a first rod (31), a first adapting bracket (32), a first torsional spring (33), a washer assembly (34), a first stationary limiting element (35), a switching element (36), a first rotating limiting element (37), a first fastener (38) and a reposition spring (39).

The first rod (31) is mounted rotatably to the first wing (13) and may have a main rod (311), a connecting segment (312), a positioning rod (313) and two threads (314, 315). The main rod (311) may be circular and has an outside end and an inside end. The connecting segment (312) may be non-circular and is formed on the outside end of the main rod (311). The positioning rod (313) may be non-circular, is formed on the inside end of the main rod (311) and has a middle part and a distal end. The threads (314, 315) are separately formed respectively on the middle part and the distal end of the positioning rod (313).

The first adapting bracket (32) is mounted securely on the first rod (31), may be attached to the connecting segment (312) of the first rod (31) and may have a non-circular hole (321). The non-circular hole (321) is formed through the first adapting bracket (32) and is mounted on the connecting segment (312) of the first rod (31) to secure the first adapting bracket (32) on the first rod (31).

The first torsional spring (33) is mounted around the first rod (31), may be mounted around the main rod (311) of the first rod (31) and is mounted between and is attached respectively to the first wing (13) of the stationary bracket (10) and the first adapting bracket (32).

The washer assembly (34) is mounted around the first rod (31) and may have multiple first spacers (341), multiple first resilient spacers (342) and an additional fastener (343). The first spacers (341) are mounted around the positioning rod (313) of the first rod (31) and include a first rotating positioning spacer. The first rotating positioning spacer is mounted securely on the positioning rod (313) of the first rod (31) and has at least one positioning protrusion corresponding to and selectively engaging the positioning detent in the first wing (13) of the stationary bracket (10). The first resilient spacers (342) are mounted around the positioning rod (313) of the first rod (31). The additional fastener (343) is mounted securely on the middle part of positioning rod (313) of the first rod (31) and may be a nut to screw with the thread (314) on the middle part of the positioning rod (313) of the first rod (31).

Figure 3:
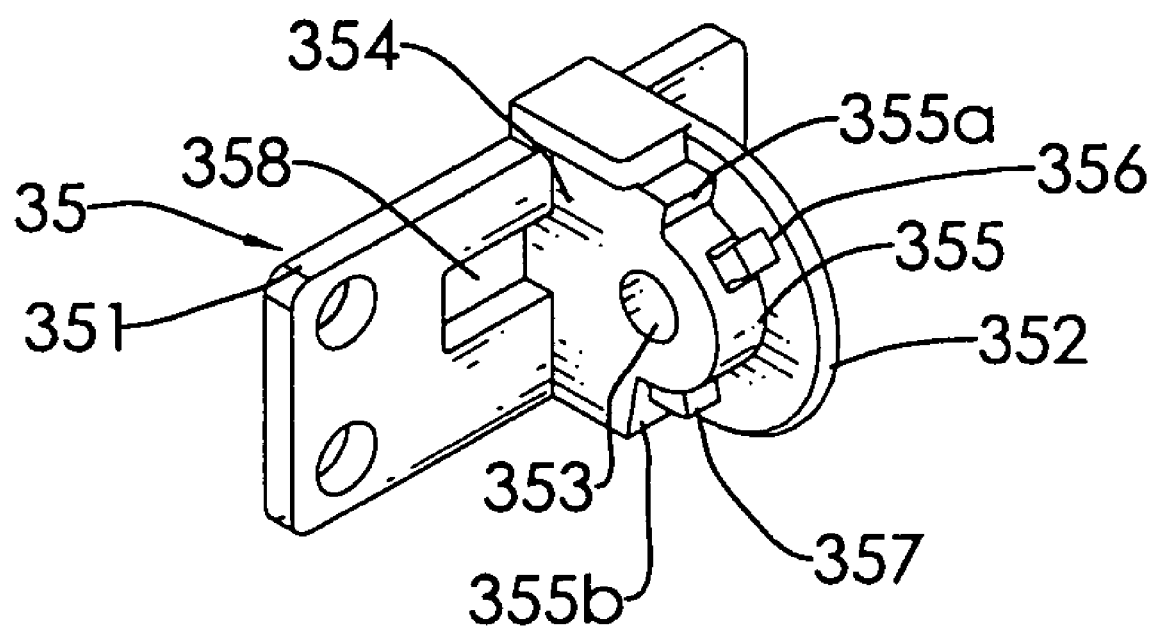
FIG. 3 is a perspective view of a first limiting bracket of the hinge in FIG. 1.

With further reference to FIG. 3, the first stationary limiting element (35) is mounted around the first rod (31) and has a longitudinal wing (351), an optional slot (358), a transverse wing (352), an optional central circular hole (353), an additional limiting element (354), a first limiting recess (355), a first stationary stop (356), and a second stationary stop (357). The first stationary limiting element (35) may be T-shaped and may be mounted around the positioning rod (313) of the first rod (31). The longitudinal wing (351) is mounted securely on the central board (11) of the stationary bracket (10). The slot (358) is formed through the longitudinal wing (351). The transverse wing (352) is formed on the longitudinal wing (351), is mounted around the first rod (31), may be mounted around the positioning rod (313) of the first rod (31) and has a mounting side and a limiting side. The washer assembly (34) is mounted between the first wing (13) of the stationary bracket (10) and the mounting side of the transverse wing (352). The central circular hole (353) is formed through the transverse wing (352) to mount the transverse wing (352) around the positioning rod (313) of the first rod (31). The additional limiting element (354) is formed on the limiting side of the transverse wing (352) and has an edge. The first limiting recess (355) is formed in the edge of the additional limiting element (354) and has a first end (355a) and a second end (355b). The first stationary stop (356) is formed in the first limiting recess (355) near the first end (355a) and is narrower than the first limiting recess (355). The second stationary stop (357) is formed in the first limiting recess (355) adjacent to the second end (355b) and is narrower than the first limiting recess (355).

The switching element (36) is moveably mounted around the first rod (31), is adjacent to the additional limiting element (35) and has an optional sliding segment (361) and a handle (362). The sliding segment (361) is formed transversely on the switching element (36) and is mounted slidably in the slot (358) of the first stationary limiting element (35). The handle (362) is formed transversely on the switching element (36).

Figure 7:
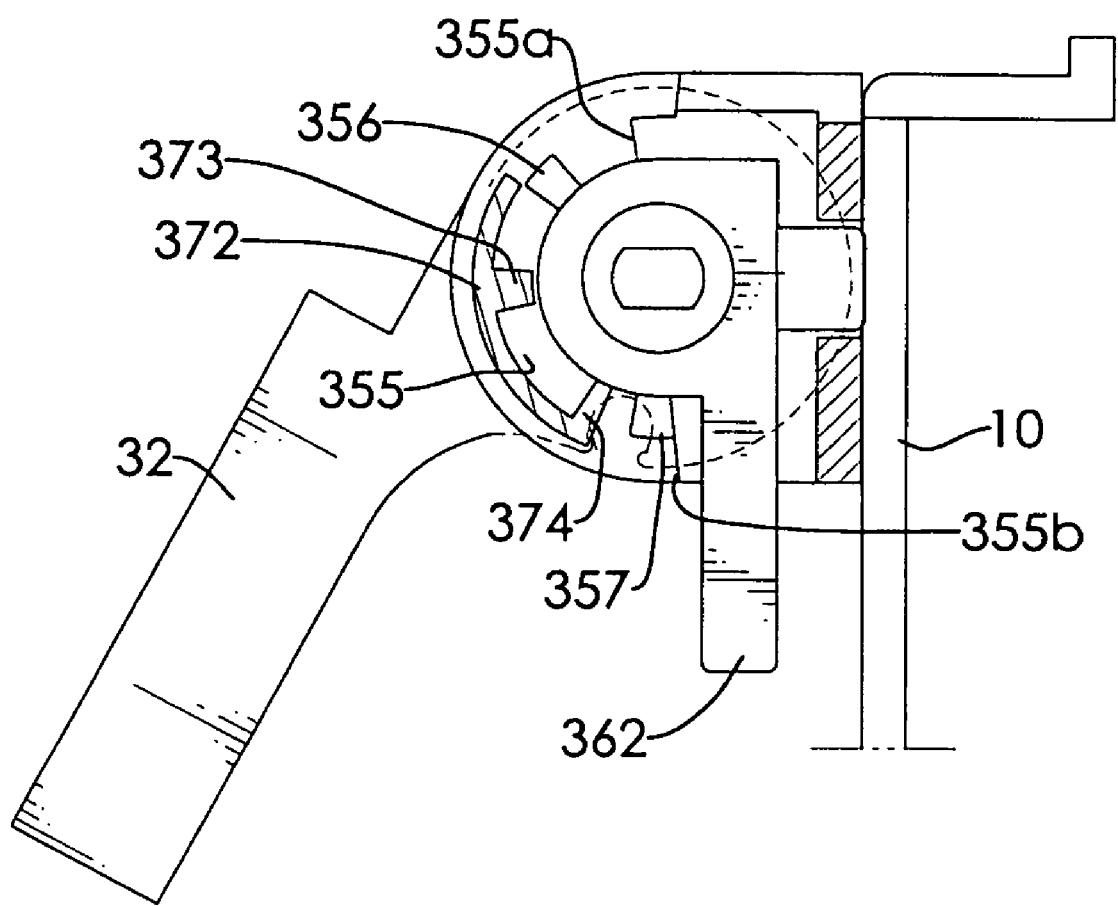
FIG. 7 is an operational end view of the hinge in FIG. 1 when the first adapting bracket is positioned at a first position.
Figure 8:
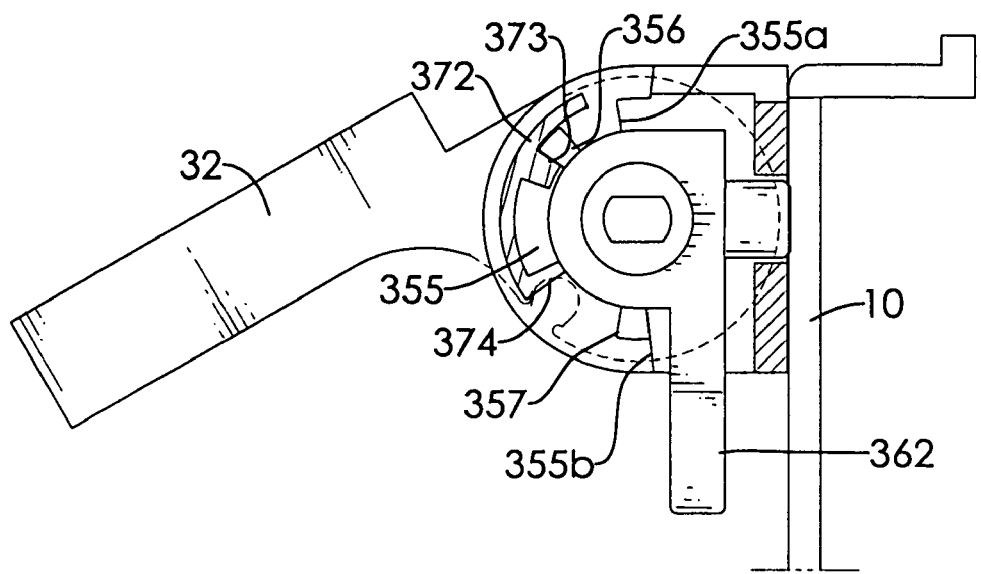
FIG. 8 is an operational end view of the hinge in FIG. 1 when the first rotating stop is against the first stationary stop on the first stationary limiting element.
Figure 9:
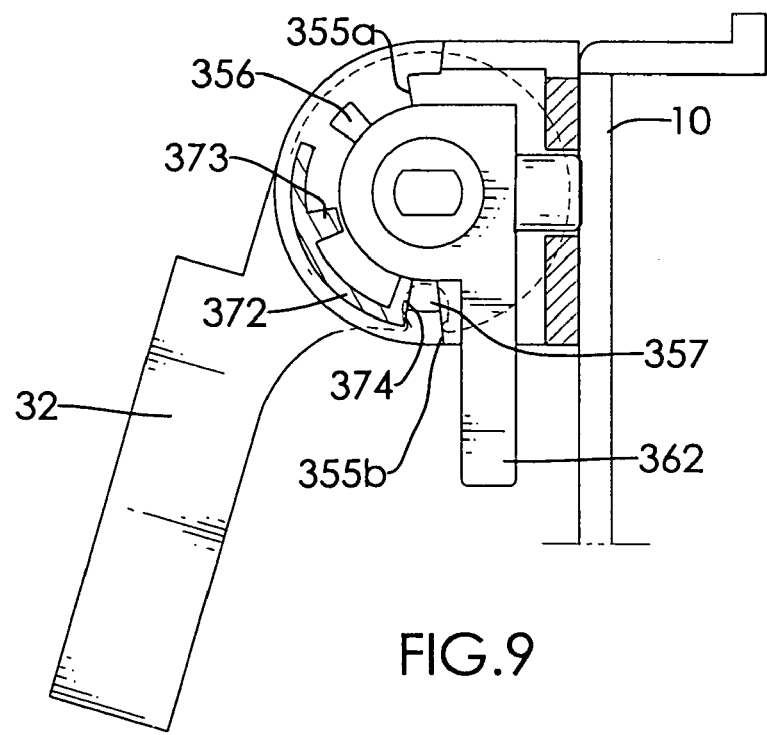
FIG. 9 is an operational end view of the hinge in FIG. 1 when the second rotating stop is against the second stationary stop on the first stationary limiting element.
Figure 10:
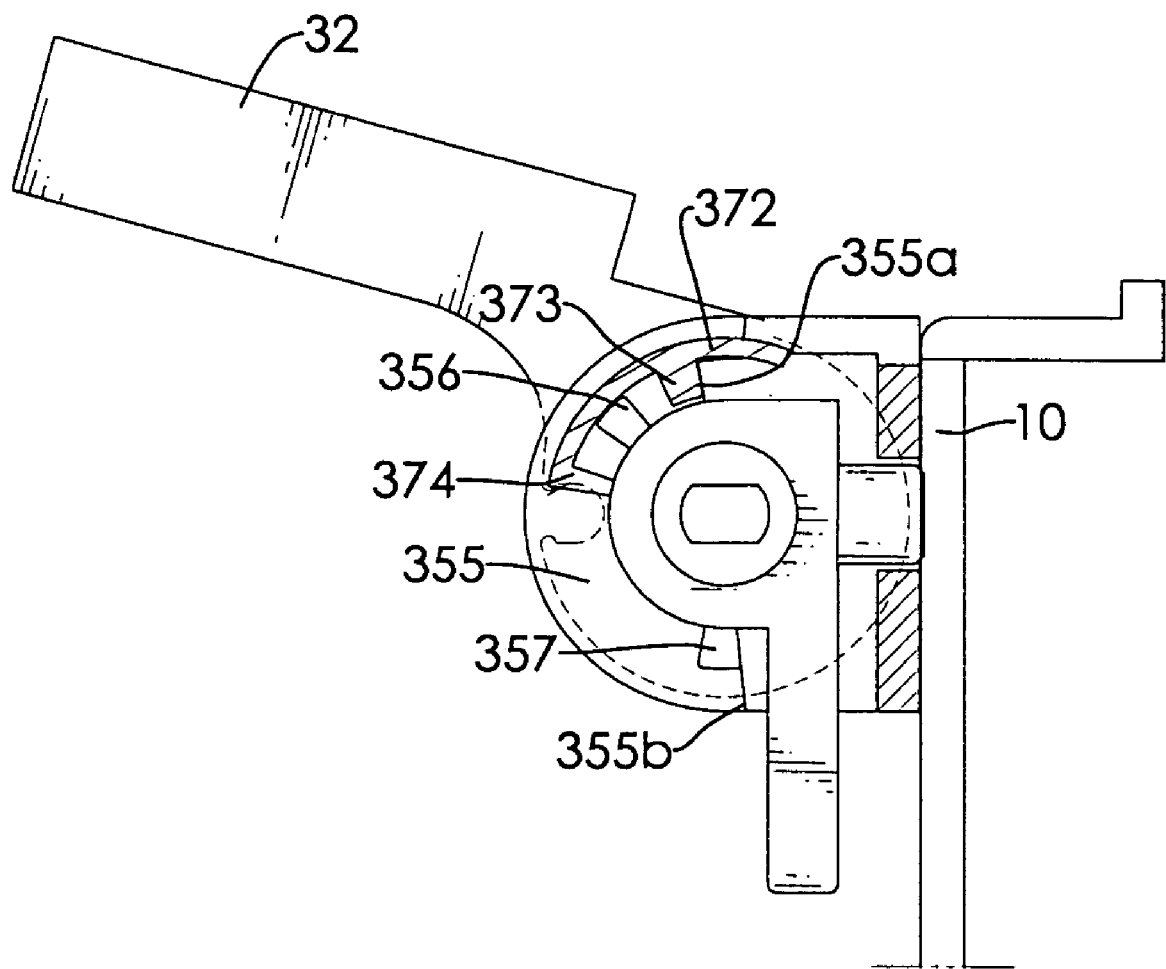
FIG. 10 is an operational end view of the hinge in FIG. 1 when the LCD is assembled or disassembled.

With further reference to FIG. 7, the first rotating limiting element (37) is mounted securely on the first rod (31), is mounted rotatably in the switching element (36) and has a distal end, a proximal end, a head (371), a limiting protrusion (372), a first rotating stop (373) and a second rotating stop (374). The head (371) is formed on the proximal end of the first rotating limiting element (37) and is adjacent to and is pushed by the switching element (36). The limiting protrusion (372) is formed on the head (371) and is mounted around the switching element (36). The first rotating stop (373) is formed on the limiting protrusion (372) and is selectively against the first stationary stop (356) of the first stationary limiting element (35) or against the first end (355a) of the first limiting recess (355). The second rotating stop (374) is formed on the limiting protrusion (372) and is selectively against the second stationary stop (357) of the first stationary limiting element (35).

The first fastener (38) is mounted securely on the first rod (31), may be mounted securely on the distal end of the positioning rod (313) of the first rod (31) and may be a nut to screw with the thread (315) of the positioning rod (313) of the first rod (31).

The reposition spring (39) is mounted around the first rod (31) and is mounted between and presses against the first rotating limiting element (37) and the first fastener (38).

The second shaft assembly (20) is mounted pivotally to the second wing (12) of the stationary bracket (10) and has a second rod (21), a second adapting bracket (22), a second torsional spring (23), multiple second spacers (24), multiple second resilient spacers (25) and a second fastener (28). The second shaft assembly (20) may have a second rotating limiting element (26) and a second stationary limiting element (27).

The second rod (21) is mounted rotatably in the second wing (12) and may have a main rod (211), a connecting segment (212), a positioning rod (213) and a thread (314). The main rod (211) may be circular and has an outside end and an inside end. The connecting segment (212) may be non-circular and is formed on the outside end of the main rod (211). The positioning rod (213) may be non-circular, is formed on the inside end of the main rod (211) and has a distal end. The thread (214) is formed on the distal end of the positioning rod (213).

The second adapting bracket (22) is mounted securely on the second rod (21), may be attached to the connecting segment (212) of the second rod (21) and may have a non-circular hole (221). The non-circular hole (221) is formed through the first adapting bracket (22) and is mounted on the connecting segment (212) of the second rod (21) to secure the second adapting bracket (22) on the second rod (21).

The second torsional spring (23) is mounted around the second rod (21), may be mounted around the main rod (211) of the second rod (21) and is mounted between and is attached respectively to the second wing (12) of the stationary bracket (10) and the second adapting bracket (22).

The second spacers (24) are mounted around the first rod (31) and may include a second rotating positioning spacer. The second rotating positioning spacer is mounted securely on the positioning rod (213) of the second rod (21) and has at least one positioning protrusion corresponding to and selectively engaging the positioning detent of the second wing (12) of the stationary bracket (10). The second resilient spacers (25) are mounted around the second rod (31).

The second fastener (28) is mounted securely on the second rod (21), may be mounted securely on the distal end of the positioning rod (213) of the second rod (21) and may be a nut to screw with the thread (214) of the positioning rod (213) of the second rod (21).

The second rotating limiting element (26) is mounted securely on the second rod (21), may be mounted securely on the positioning rod (211) of the second rod (21) and has a non-circular hole (261) and a rotating limiting stop (262). The non-circular hole (261) is formed through the second rotating limiting element (26) and is mounted on the positioning rod (213) of the second rod (21) to secure the second rotating limiting element (26) on the second rod (21). The rotating limiting stop (262) is formed transversely on the second rotating limiting element (26).

The second stationary limiting element (27) is L-shaped, is mounted securely on the central board (11) of the stationary bracket (10), is mounted around the second rod (21) and has a longitudinal wing, a transverse wing, a central circular hole (271) and a second limiting recess (272). The longitudinal wing of the second stationary limiting element (27) is mounted securely on the central board (11) of the stationary board (10). The transverse wing of the second stationary limiting element (27) is formed on the longitudinal wing of the second stationary limiting element (27), is mounted around the second rod (21), may be mounted around the positioning rod (213) of the second rod (21) and has an edge. The central circular hole (271) is formed through the transverse wing of the second stationary limiting element (27) to mount the transverse wing around the positioning rod (213) of the second rod (21). The second limiting recess (272) is formed in the edge of the transverse wing of the second stationary limiting element (27) and has two ends selectively against the rotating limiting stop (262) to limit the rotating angle of the second rod (21) in a desired degree range, such as 90 degrees.

Figure 4:
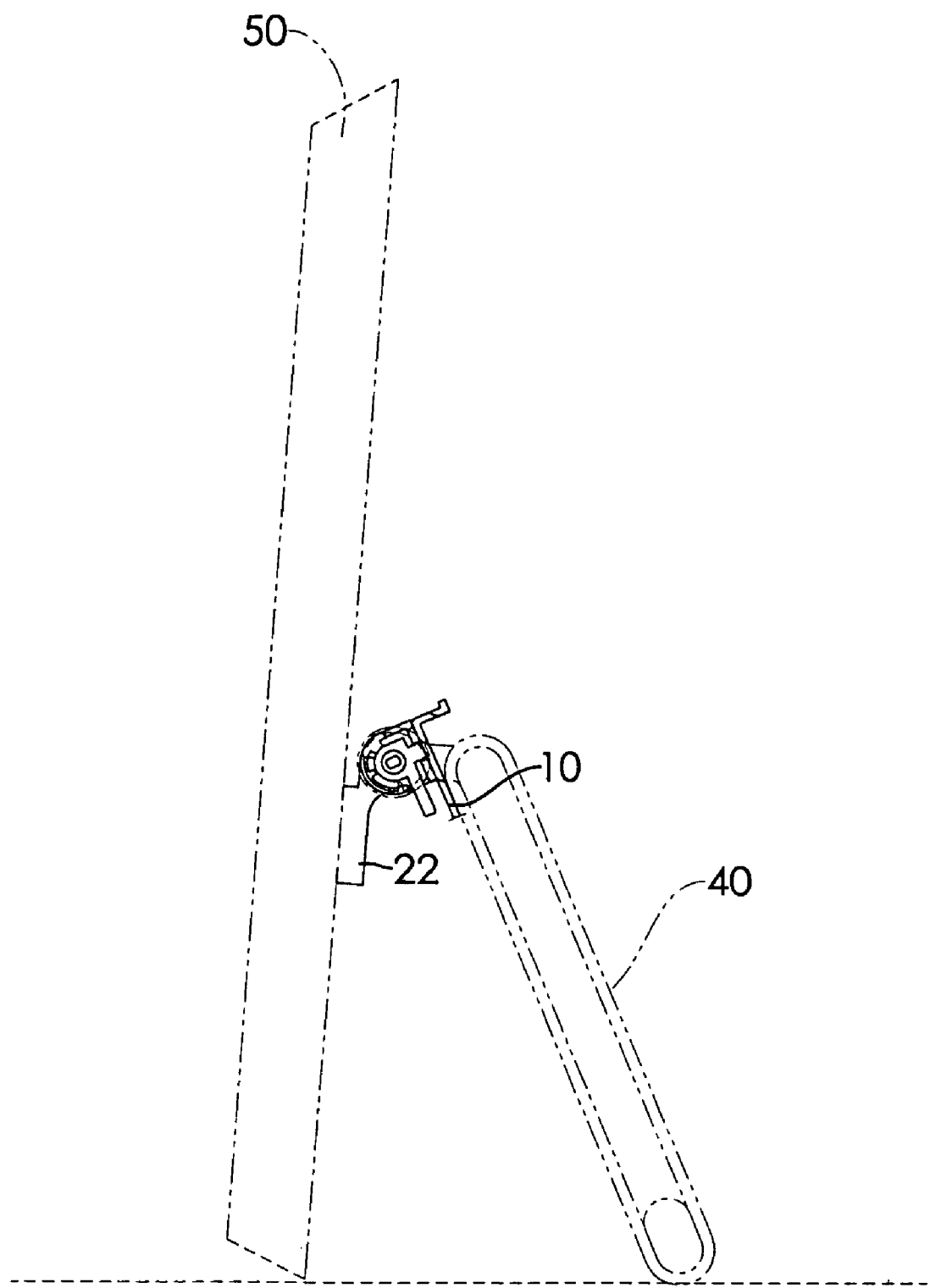
FIG. 4 is an operational end view of a liquid crystal display with the hinge in FIG. 1.
Figure 5:
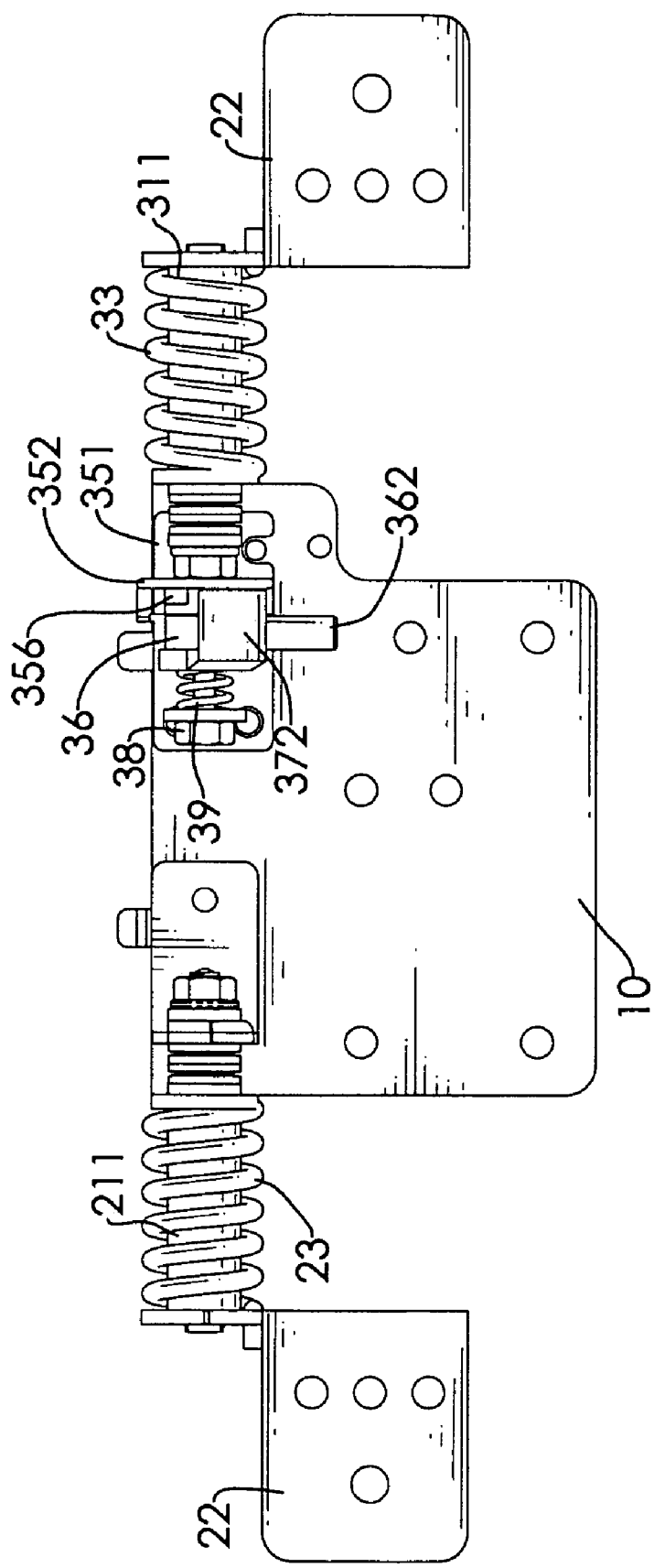
FIG. 5 is a side view of the hinge in FIG. 1.
Figure 6:
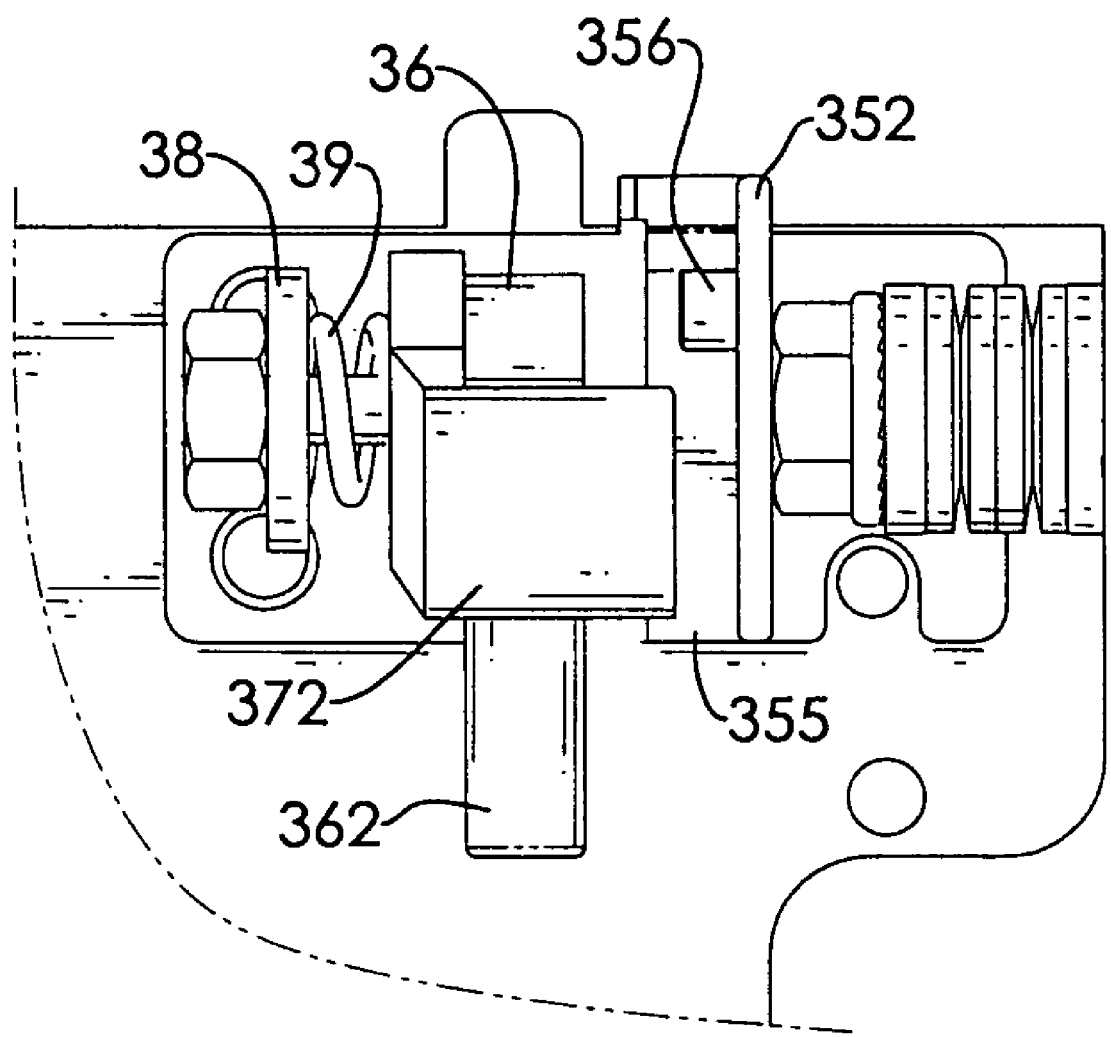
FIG. 6 is an operational partially enlarged view of the hinge in FIG. 1 when the hinge is assembled with the LCD.

With reference to FIGS. 2 and 4, a LCD comprises a base (40) and a screen (50). The stationary bracket (10) is attached to the base (40) of the LCD. The first and second adapting brackets (32, 22) are attached to the screen (50). When the viewing angle of the screen (50) is adjusted, the first and second adapting brackets (32, 22) are rotated to rotate the first and second rods (31, 21). With further reference to FIG. 7, when the first rod (31) is rotated, the first rod (31) rotates first rotating limiting element (37). Then the first and second rotating stop (373, 374) of the first rotating limiting element (37) move along the first limiting recess (355) of the first stationary limiting element (35).

With reference to FIGS. 2-5, 8 and 9, when the first and second rotating stops (373, 374) of the first rotating limiting element (37) are moved along the first limiting recess (355) in the first stationary limiting element (35), the user can adjust the viewing angle of the screen (50). The first rotating stop (373) is against the first stationary stop (356) of the first stationary limiting element (35) or the second rotating stop (374) is against the second stationary stop (357) of the first stationary limiting element (35) to limit the rotating angle of the first rod (31). Therefore, the adjusting angle of the screen (50) is limited.

With reference to FIGS. 2-4, 6 and 10, when the hinge is assembled onto or disassembled From the LCD, the handle (362) of the switching element (36) is firstly pushed to press the reposition spring (39). Because the first stationary stop (356) of the first stationary limiting element (35) is narrower than the first limiting recess (355), the first rotating stop (373) corresponds to the first end (355a) of the first limiting recess (355) and does not correspond to the first stationary stop (356) of the first stationary limiting element (35) when the handle (362) of the switching element (36) is pushed to press the reposition spring (39). When the first rotating stop (373) is against the first end (355a) of the first limiting recess (355), the screen (50) is perpendicular to the base (40) to assemble or to disassemble the hinge easily.

The advantage of the present invention is to provide a hinge that has different limitations to the rotating angle. Changing the position of the switching element (36), the position of the first rotating limiting element (37) is changed and the limitation to the rotating angle of the screen (50) is also varied. Accordingly, the screen (50) can be pivoted to a position with a good viewing angle based on the user's needs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for a liquid crystal display comprising
 a stationary bracket having
  a central board having two sides;
  a first wing formed on one of the two sides of the central board and being perpendicular to the central board; and
  a second wing formed on the other one of the two sides of the central board and being perpendicular to the central board;
 a first shaft assembly mounted pivotally to the first wing of the stationary bracket and having
  a first rod mounted rotatably to the first wing;
  a first adapting bracket mounted securely on the first rod;
  a first torsional spring mounted around the first rod and mounted between and attached respectively to the first wing of the stationary bracket and the first adapting bracket;
  a washer assembly mounted around the first rod;
  a first stationary limiting element mounted around the first rod and having
   a longitudinal wing mounted securely on the central board of the stationary bracket;
   a transverse wing formed on the longitudinal wing, mounted around the first rod and having a mounting side and a limiting side, wherein the washer assembly is mounted between the first wing of the stationary bracket and the mounting side of the transverse wing;
   an additional limiting element formed on the limiting side of the transverse wing and having an edge;
   a first limiting recess formed in the edge of the additional limiting element and having a first end and a second end;
   a first stationary stop formed in the first limiting recess near the first end and being narrower than the first limiting recess; and
   a second stationary stop formed in the first limiting recess adjacent to the second end and being narrower than the first limiting recess;
  a switching element moveably mounted around the first rod, being adjacent to the additional limiting element and having a handle formed transversely on the switching element;
  a first rotating limiting element mounted securely on the first rod, mounted rotatably in the switching element and having
   a distal end;
   a proximal end;
   a head formed on the proximal end of the first rotating limiting element and being adjacent to the switching element;
   a limiting protrusion formed on the head and mounted around the switching element;
   a first rotating stop formed on the limiting protrusion and being selectively against one of the first stationary stop of the first stationary limiting element and the first end of the first limiting recess; and
   a second rotating stop formed on the limiting protrusion and being selectively against the second stationary stop of the first stationary limiting element;
  a first fastener mounted securely on the first rod; and
  a reposition spring mounted around the first rod and mounted between and pressing against the first rotating limiting element and the first fastener; and
 a second shaft assembly mounted pivotally to the second wing of the stationary bracket and having
  a second rod mounted rotatably to the second wing;
  a second adapting bracket mounted securely on the second rod;
  a second torsional spring mounted around the second rod and mounted between and attached respectively to the second wing of the stationary bracket and the second adapting bracket;

multiple second spacers mounted around the first rod;
multiple second resilient spacers; and
a second fastener mounted securely on the second rod.

2. The hinge as claimed in claim 1, wherein
the first stationary limiting element has a slot formed through the longitudinal wing of the first stationary limiting element; and
the switching element has a sliding element formed transversely on the switching element and mounted slidably in the slot of the first stationary limiting element.

3. The hinge as claimed in claim 2, wherein
the first rod has
   a main rod having an outside end and an inside end;
   a connecting segment formed on the outside end of the main rod; and
   a positioning rod formed on the inside end of the main rod and has a middle part and a distal end;
the first adapting bracket is attached to the connecting segment of the first rod;
the first torsional spring is mounted around the main rod of the first rod;
the transverse wing of the first stationary limiting element is mounted around the positioning rod of the first rod;
the first fastener is mounted securely on the distal end of the positioning rod of the first rod;
the second rod has
   a main rod having an outside end and an inside end;
   a connecting segment formed on the outside end of the main rod; and
   a positioning rod formed on the inside end of the main rod and having a distal end;
the second adapting bracket is attached to the connecting segment of the second rod;
the second torsional spring is mounted around the main rod of the second rod; and
the second fastener is mounted securely on the distal end of the positioning rod of the second rod.

4. The hinge as claimed in claim 3, wherein
the connect segment of the first rod is non-circular;
the first adapting bracket has a non-circular hole formed through to secure the first adapting bracket on the first rod;
the connecting segment of the second rod is non-circular; and
the second adapting bracket has a non-circular hole formed through to secure the second adapting bracket on the second rod.

5. The hinge as claimed in claim 4, wherein the second shaft assembly further comprises
a second rotating limiting element mounted securely on the positioning rod of the second rod and having
   a non-circular hole formed through the second rotating limiting element and mounted on the positioning rod of the second rod to secure the second rotating limiting element on the second rod; and
   a rotating limiting stop formed transversely on the second rotating limiting element; and
a second stationary limiting element being L-shaped, mounted securely on the central board of the stationary bracket, mounted around the second rod and having
   a longitudinal wing mounted securely on the central board of the stationary board;
   a transverse wing formed on the longitudinal wing of the second stationary limiting element, mounted around the positioning rod of the second rod and having an edge;
   a central circular hole formed through the transverse wing of the second stationary limiting element; and
   a second limiting recess formed in the edge of the transverse wing of the second stationary limiting element and having two ends selectively against the rotating limiting stop.

6. The hinge as claimed in claim 5, wherein
each wing of the stationary bracket has
   an outside surface;
   an inside surface, wherein the two inside surfaces of the two wings face to each other;
   a central circular hole formed through the wing of the stationary bracket; and
   at least one positioning detent formed in the inside surface of the wing of the stationary bracket;
the washer assembly has a first rotating positioning spacer mounted securely on the positioning rod of the first rod and having at least one positioning protrusion corresponding to and selectively engaging the at least one positioning detent of the first wing of the stationary bracket; and
the second spacers comprises a second rotating positioning spacer mounted securely on the positioning rod of the second rod and having at least one positioning protrusion corresponding to and selectively engaging the at least one positioning detent of the second wing of the stationary bracket.

* * * * *